US012470016B2

(12) United States Patent
Do et al.

(10) Patent No.: US 12,470,016 B2
(45) Date of Patent: Nov. 11, 2025

(54) FLOATING POGO CONNECTORS FOR TABLET COMPUTERS OF AIRCRAFT INFLIGHT ENTERTAINMENT SYSTEMS AND CREW TERMINALS

(71) Applicant: Thales Avionics, Inc., Irvine, CA (US)

(72) Inventors: Ton Do, Corona, CA (US); Douglas Green, Anaheim, CA (US); Deo M. Magakat, Colton, CA (US)

(73) Assignee: Thales Avionics, Inc., Irvine, CA (US)

( * ) Notice: Subject to any disclaimer, the term of this patent is extended or adjusted under 35 U.S.C. 154(b) by 478 days.

(21) Appl. No.: 17/848,890

(22) Filed: Jun. 24, 2022

(65) Prior Publication Data

US 2023/0420884 A1 Dec. 28, 2023

(51) Int. Cl.
*H01R 13/62* (2006.01)
*H01R 13/24* (2006.01)
*H01R 43/20* (2006.01)

(52) U.S. Cl.
CPC ......... *H01R 13/6205* (2013.01); *H01R 13/24* (2013.01); *H01R 43/20* (2013.01)

(58) Field of Classification Search
CPC ............................ H01R 13/6205; H01R 43/20
USPC ....................................... 439/38–40, 700, 66
See application file for complete search history.

(56) References Cited

U.S. PATENT DOCUMENTS

| | | | | | |
|---|---|---|---|---|---|
| 5,415,561 | A * | 5/1995 | Mavrin | H01R 13/5219 | 439/341 |
| 7,311,526 | B2 * | 12/2007 | Rohrbach | G06F 1/18 | 439/39 |
| 7,775,801 | B2 * | 8/2010 | Shiff | H01R 13/6205 | 439/700 |
| 8,512,048 | B2 * | 8/2013 | Yasuoka | H01R 13/73 | 439/39 |
| 8,596,881 | B2 * | 12/2013 | Umeno | G02B 6/3817 | 439/38 |
| 8,734,024 | B2 * | 5/2014 | Isenhour | G02B 6/4292 | 385/57 |
| 9,017,092 | B1 * | 4/2015 | McCracken | H01R 13/648 | 439/39 |
| 9,261,651 | B2 * | 2/2016 | Benjamin | G02B 6/4204 | |
| 9,466,909 | B1 * | 10/2016 | Lin | H01R 13/2421 | |
| 9,577,372 | B1 * | 2/2017 | Kakish | H01R 13/642 | |
| 9,640,921 | B2 * | 5/2017 | Choi | H01R 13/6683 | |
| 10,658,789 | B1 * | 5/2020 | Wang | H01R 24/28 | |
| 11,050,189 | B1 * | 6/2021 | Garcia | H04B 1/3833 | |
| 11,749,942 | B2 * | 9/2023 | Yang | H01R 13/502 | 439/39 |

(Continued)

*Primary Examiner* — Hae Moon Hyeon
(74) *Attorney, Agent, or Firm* — Sage Patent Group

(57) ABSTRACT

A first connector, for coupling to a second connector, including a support structure, a set of spring-biased pogo pins arranged in a linear configuration and configured to carry at least one of electrical signals and power, a resilient structure extending across a face of the support structure, and a first pair of magnetic couplers attached to the resilient structure on opposite sides of the set of spring-biased pogo pins is disclosed. The spring- biased pogo pins are each located in a corresponding passage in the support structure. The first pair of magnetic couplers are configured to mate with a corresponding second pair of magnetic couplers of the second connector and compress the resilient structure to bias the set of spring-biased pogo pins against a corresponding set of target contact pads of the second connector.

17 Claims, 6 Drawing Sheets

(56) References Cited

U.S. PATENT DOCUMENTS

| | | | | |
|---|---|---|---|---|
| 2007/0072443 | A1* | 3/2007 | Rohrbach | G06F 1/1633 439/39 |
| 2008/0164934 | A1* | 7/2008 | Hankey | H01R 13/2428 439/39 |
| 2008/0232061 | A1* | 9/2008 | Wang | G06F 1/1632 361/679.41 |
| 2011/0092081 | A1* | 4/2011 | Gao | H01R 13/5845 439/502 |
| 2014/0113461 | A1* | 4/2014 | Kim | H01R 13/6205 439/39 |
| 2014/0148018 | A1* | 5/2014 | Kim | H01R 13/6205 439/39 |
| 2014/0300321 | A1* | 10/2014 | Kim | H02J 7/0048 320/137 |
| 2015/0118868 | A1* | 4/2015 | Choi | H01R 13/6205 439/39 |
| 2015/0280343 | A1* | 10/2015 | Hsu | H01R 13/2421 29/884 |
| 2016/0043501 | A1* | 2/2016 | Kim | H01R 13/6205 439/39 |
| 2016/0141809 | A1* | 5/2016 | Choi | H01R 13/703 439/38 |
| 2016/0361563 | A1* | 12/2016 | Wang | H05K 5/0086 |
| 2018/0294596 | A1* | 10/2018 | Zhang | H01R 13/24 |
| 2020/0050239 | A1* | 2/2020 | Ni | F16M 13/02 |
| 2020/0161788 | A1* | 5/2020 | Lin | H01R 13/506 |
| 2021/0022792 | A1* | 1/2021 | Beaupre | A61B 18/1445 |
| 2021/0373599 | A1* | 12/2021 | Lim | H04M 1/0274 |
| 2023/0237288 | A1* | 7/2023 | Liu | H01R 13/2421 340/10.1 |
| 2023/0420884 | A1* | 12/2023 | Do | H01R 13/6205 |

* cited by examiner

FLOATING POGO CONNECTORS FOR TABLET COMPUTERS OF AIRCRAFT INFLIGHT ENTERTAINMENT SYSTEMS AND CREW TERMINALS

FIELD OF THE INVENTION

The described embodiments relate generally to a connector for an accessory device capable of exchanging power and data with an electronic device and, more particularly, to docking stations for table computers configured for aircraft inflight entertainment systems and crew terminals.

BACKGROUND

Electronic devices (e.g., a tablet, a smart phone, etc.) have recently been changing to portable or wearable types that can be docked for communication and charging functionality. Docking is provided through various types of connectors which couple an input/output (I/O) interface of an electronic device to a system interface having power and data wirelines, such as a system interface providing connectivity of a passenger personal electronic device (PED) to a seat video display unit of an aircraft inflight entertainment (IFE) system or connectivity of a crew terminal to an aircraft IFE or other system.

Aircraft environments can be subject to high levels of vibration which can cause unreliable connectivity between I/O interfaces of electronic devices and docking interfaces. Maintaining a reliable constant connection is particularly challenging for docked portable tablet computers in an aircraft environment experiencing high levels of vibration due the vibrational movements of the table computers relative to the docking interface.

In one docking approach, a connector port having an inserting groove in one surface of the electronic device is mounted to a Printed Circuit Board (PCB) inside the electronic device and is configured to be partially exposed to the outside, and an electrical connection is made in such a manner that a connector installed on one end of the connector device is inserted to the inserting groove, thereby enabling charging and/or data transmission/reception functions. However, insertion based connectors can be prone to fatigue failure from cyclic stresses as the electronic device moves relative to the connector in a high vibration aircraft environment.

In another docking approach, an attach-type electrical connector has a plurality of pogo pins protruding from a connector body which can electrically couple to contact pads of a corresponding connector interface of the electronic device. A pair of magnets are located on both sides of the pogo pins of the electrical connector to magnetically couple to a magnetic material, such as iron or the like, located on opposite sides of the contact pads of the connector interface of the electronic device. The electrical connector thereby magnetically coupling to the electronic device to mate and urge the pogo pins to maintain contact with the corresponding contact pads.

However, when subject to high levels of vibration in an aircraft environment, the attach-type electrical connector can experience intermittent disconnections of the pogo pins of the connection from the contact pads of the electronic device. Such intermittent disconnections result in loss of communication connectivity and loss of data. For example, passengers or crew may observe loss of entire video frames, pixelation of video/pictures, lost incoming/outgoing voice segments, erroneous operation of user applications, incorrect loading of web pages, and other unacceptable operational failures.

SUMMARY

Some embodiments of the present disclosure are directed to a first connector, for coupling to a second connector, including a support structure, a set of spring-biased pogo pins arranged in a linear configuration and configured to carry at least one of electrical signals and power, a resilient structure extending across a face of the support structure, and a first pair of magnetic couplers attached to the resilient structure on opposite sides of the set of spring-biased pogo pins. The spring-biased pogo pins are each located in a corresponding passage in the support structure. The first pair of magnetic couplers are configured to mate with a corresponding second pair of magnetic couplers of the second connector and compress the resilient structure to bias the set of spring-biased pogo pins against a corresponding set of target contact pads of the second connector.

The first connector can be an integrated part of a docking station, which may be located in an aircraft seatback or other cabin surface. The second connector can be an integrated part of a first electronic device, such as a passenger PED, crew terminal, etc. The docking station electrically interconnects the set of spring-biased pogo pins to electronic circuits of a second electronic device, such as an aircraft inflight entertainment system or other system.

Other embodiments of the present disclosure are directed to a method of making a first connector for coupling to a second connector. The method includes providing a support structure. The method also includes providing a set of spring-biased pogo pins arranged in a linear configuration and configured to carry at least one of electrical signals and power, the spring-biased pogo pins each located in a corresponding passage in the support structure. The method also includes forming a resilient structure extending across a face of the support structure. The method also includes attaching a first pair of magnetic couplers to the resilient structure on opposite sides of the set of spring-biased pogo pins. The first pair of magnetic couplers are configured to mate with a corresponding second pair of magnetic couplers of the second connector and compress the resilient structure to bias the set of spring-biased pogo pins against a corresponding set of target contact pads of the second connector.

Potential advantages of these embodiments include maintaining reliable connection between the first and second connectors in high vibration aircraft environments. These and other embodiments disclosed herein, when subject to high levels of vibration in an aircraft environment, may not experience intermittent disconnections of the pogo pins of the first connector from the contact pads of the second connector and, therefore, not experience loss of communication connectivity and loss of data.

It is noted that aspects described with respect to one embodiment may be incorporated in different embodiments although not specifically described relative thereto. That is, all embodiments and/or features of any embodiments can be combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

As explained above, when subject to high levels of vibration in an aircraft environment, the attach-type electrical connector can experience intermittent disconnections of the pogo pins of the connector from the contact pads of the connector interface of the electronic device. Such intermittent disconnections result in loss of communication connectivity and loss of data. For example, passengers or crew may observe loss of entire video frames, pixelation of video/pictures, lost incoming/outgoing voice segments, erroneous operation of user applications, incorrect loading of web pages, and other unacceptable operational failures Electronic devices, such as tablet computers are used as passenger terminals and crew terminals, can be docked to docking stations (or docks) for stowing and charging during flight take off and landing, as well as for communication interconnectivity with seat video display units of aircraft IFE systems and/or crew systems. Through vibration testing, it has been determined that the spring-loaded pogo pins in a docking station can become intermittently disconnected from the target contact pads in a tablet computer during the high vibration level defined in standard DO-160G for Environmental Conditions and Test Procedures for Airborne Equipment. One reason that has been determined is that the spring biased pogo pins have mechanical modes of movement that are not inherently adapted to operate in the rapidly changing compression and extraction inducements of high amplitude and frequency vibration.

Figure 1:
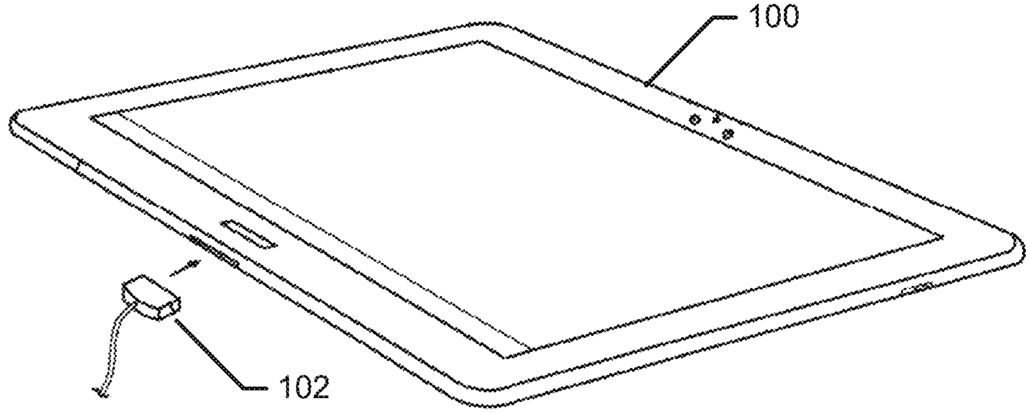
FIG. 1 illustrates an example implementation of a conventional connection between an electronic device, such as a tablet device as illustrated, and a pogo connector.

FIG. 1 illustrates an example implementation of a conventional connection between an electronic device 100, such as a tablet device as illustrated, and a pogo connector 102.

Referring to FIG. 1, a cable has a pogo connector 102 installed at one end which is electrically connectable through contact of pogo pins with the contact pads of a connector port of the electronic device 100, illustrated as a table computer. The cable interconnects the electronic device 100 to a power source (e.g., direct current (DC) power) and another electronic device, e.g., external computer (not shown). An example connector 102 may be based on a Universal Serial Bus (USB) socket. The pogo connector 102 may uses magnetic coupling to attempt to maintain coupling between the pogo pins with the contact pads of the electronic device 100. More particularly, the magnets of the pogo connector 102 are integrated within a shell of the pogo connector 102 which is thereby magnetically biased to contact the electronic device, however there is no mechanism for magnetically biasing the pogo pins themselves toward the contact pads of the electronic device 100.

When the electronic device 100 is sufficiently vibrated relative to the connector 102, at least some or all of the pogo pins of the pogo connector 102 can no longer maintain a constant connection with the contact pads of the electronic device 100, even with the magnetic coupling. Resulting intermittent disconnection occurs which leads to disruption in the providing of power and/or communication of data through the pogo connector 102.

Although various embodiments are presently described for use in aircraft environments, they are not limited thereto can be implemented in any vehicle, such as motor vehicles (motorcycles, cars, trucks, buses), railed vehicles (trains, trams), watercraft (ships, boats, underwater vehicles), and spacecraft.

An electronic device according to embodiments of the present disclosure may be any type of electronic device including a communication function provided through coupling of pogo pins with contact pads. Examples of electronic devices include, but are not limited to, a smart phone, a tablet personal computer (hereinafter "tablet"), an e-book reader, a laptop computer, a netbook computer, a personal digital assistant (PDA), a portable multimedia player (PMP), a portable gaming console, and a wearable device, such as a head-mounted-device (HMD) with augmented reality or virtual reality capabilities. Other examples of electronic devices include, but are not limited to, various medical devices such as magnetic resonance angiography (MRA) devices, magnetic resonance imaging (MRI) machines, computed tomography (CT) equipment, imaging equipment, and ultrasonic instruments, etc., a navigation device, a global positioning system (GPS) receiver, an event data recorder (EDR), a flight data recorder (FDR), a car infotainment device, an electronic equipment for a ship (e.g., a vessel navigation device, a gyro compass, etc.), avionics, a security device, a car head unit, an industrial or domestic robot, automatic teller machines (ATMs) of financial institutions, and point of sales (POS) devices of shops.

Embodiments of the present disclosure are directed to providing a connector that can be capable of maintaining reliable connection with another connector when subject to vibration, which in some embodiments may correspond to high vibrations which occur in aircraft and other operational environments. FIGS. 2-6 illustrate some embodiments of the inventive concept for docking a connector of a tablet computer with a connector of a docking station.

Some embodiments are directed to providing a resilient structure (e.g., resilient support layer such as a rubber pad, leaf spring, etc.) which biases the pogo pins of the docketing station connector toward the mating contact pads of a tablet computer interface by forces generated on the resilient structure by magnetic coupling between magnetic posts and magnetic sockets of the docketing station and wireless device interfaces.

To meet the vibration requirement of various operational environments such as aircraft, various embodiments use a combination of the resilient structure biasing the floating pogo pins connector and magnetic coupling between the matting sides to bias the resilient structure toward the pogo pins to maintain contact with the target contact pads.

The connector in the docking station can be floating relative to a shell of the docking station to facilitate alignment and coupling of the connector to the table computer. Moreover, because of connector floats relative to the shell which can be mounted to a seating surface, bulkhead, etc., it can move relative to the shell while maintaining contact with the tablet computer while docked and subjected to vibration.

The magnetic coupling between the connector in the docking station and the table computer keeps the pogo pins in the connector of the docking station held together and electronically coupled to the contact pads of the table computer.

Some embodiments of the present disclosure are directed to a first connector for coupling to a second connector. The first connector includes a support structure, a set of spring-biased pogo pins, a resilient structure, and a first pair of magnetic couplers. The set of spring-biased pogo pins are arranged in a linear configuration and configured to carry at least one of electrical signals and power. Additionally, the spring-biased pogo pins are each located in a corresponding passage in the support structure. The resilient structure extends across a face of the support structure. The first pair of magnetic couplers are attached to the resilient structure on opposite sides of the set of spring-biased pogo pins. The first pair of magnetic couplers are configured to mate with a corresponding second pair of magnetic couplers of a docking station and compress the resilient structure to bias the set of spring-biased pogo pins against a corresponding set of target contact pads of the second connector.

In some embodiments, the first connector electronically interconnects the set of spring-biased pogo pins to an electrical circuit of a first electronic device, such as an inflight entertainment system. The second connector electronically interconnects the target contact pads to an electrical circuit of a second electronic device, such as a tablet. In some embodiments, the first and second electronic devices the connected to the first connector and the second connector may be switched.

Spring-biased pogo pins include a spring-loaded depressible electrical contact. In some embodiments, the spring-biased pogo pin include an internal movable magnet that cooperates with a spring to oppose depression of the electrical contact.

The spring is configured to allow electrical contact to retract into housing of the pogo pin. The pogo pin can also include a spring coupling device, which includes a protrusion for mating with the spring. The electrical contact between electrical contact and the pogo pin housing allows electricity and/or data to be transferred from electrical contact to the pogo pin housing and then out of pogo pin entirely by way of electrically conductive pathway. Electrically conductive pathway can take the form of one or more wires that carry the power and/or signals to another electrical component for further processing. In some embodiments, multiple pogo pins can be used in a single connector to carry different power levels and signal types. The pogo pin is configured to avoid or reduce electricity being forced to travel through the spring of the pogo pin, and since spring is not designed to carry electricity the risk of a short circuit and/or damage to the spring increases substantially. The spring shape of spring can also add unwanted inductance to any signal transmitted through spring.

Some further embodiments are disclosed that include movable magnets that are configured to assist in connection and/or alignment of electrical connectors.

“Magnetic” is used herein to refer to herein as a material containing a permanently magnetization, or a material attracted to a magnetized material, and can alternatively refer to a circuit configuration providing electromagnetic coupling.

A pair of magnetic couplers may be either a pair of magnetic posts or a pair of magnetic sockets. The first pair of magnetic couplers and second pair of magnetic couplers are configured to mate a magnetic post with a magnetic socket. For example, the first pair of magnetic couplers may include a pair of magnetic posts, and the second pair of magnetic couplers may include a pair of magnetic sockets. In another example, the first pair of magnetic couplers may include a magnetic post and a magnetic socket, and the second pair of magnetic couplers may include a magnetic socket and a magnetic post in an opposite configuration to the first pair of magnetic couplers such that the magnetic posts mate with the magnetic sockets.

The magnetic socket may be material permanently attracted to a permanently magnetized material if the magnetic posts contain a permanently magnetized material and/or an electromagnetic material. Alternatively, the magnetic socket may include a permanently magnetized material if the magnetic posts contain a material permanently attracted to a permanently magnetized material. A permanently magnetized material includes at least one of alnico, ferrite, flexible rubber, and rare earth magnets, such as samarium cobalt and neodymium. A material permanently attracted to a permanently magnetized material may include at least one magnetic metal such as iron, nickel, cobalt, steel, stainless steel, and rare earth metals.

The first pair of magnetic couplers are connected to a resilient structure (e.g., resilient material layer, leaf spring, etc.) which is biased upward to push the pogo pins 200 toward the target contact pads through the magnetic coupling of the first pair of magnetic couplers and second pair of magnetic couplers.

Figure 2:
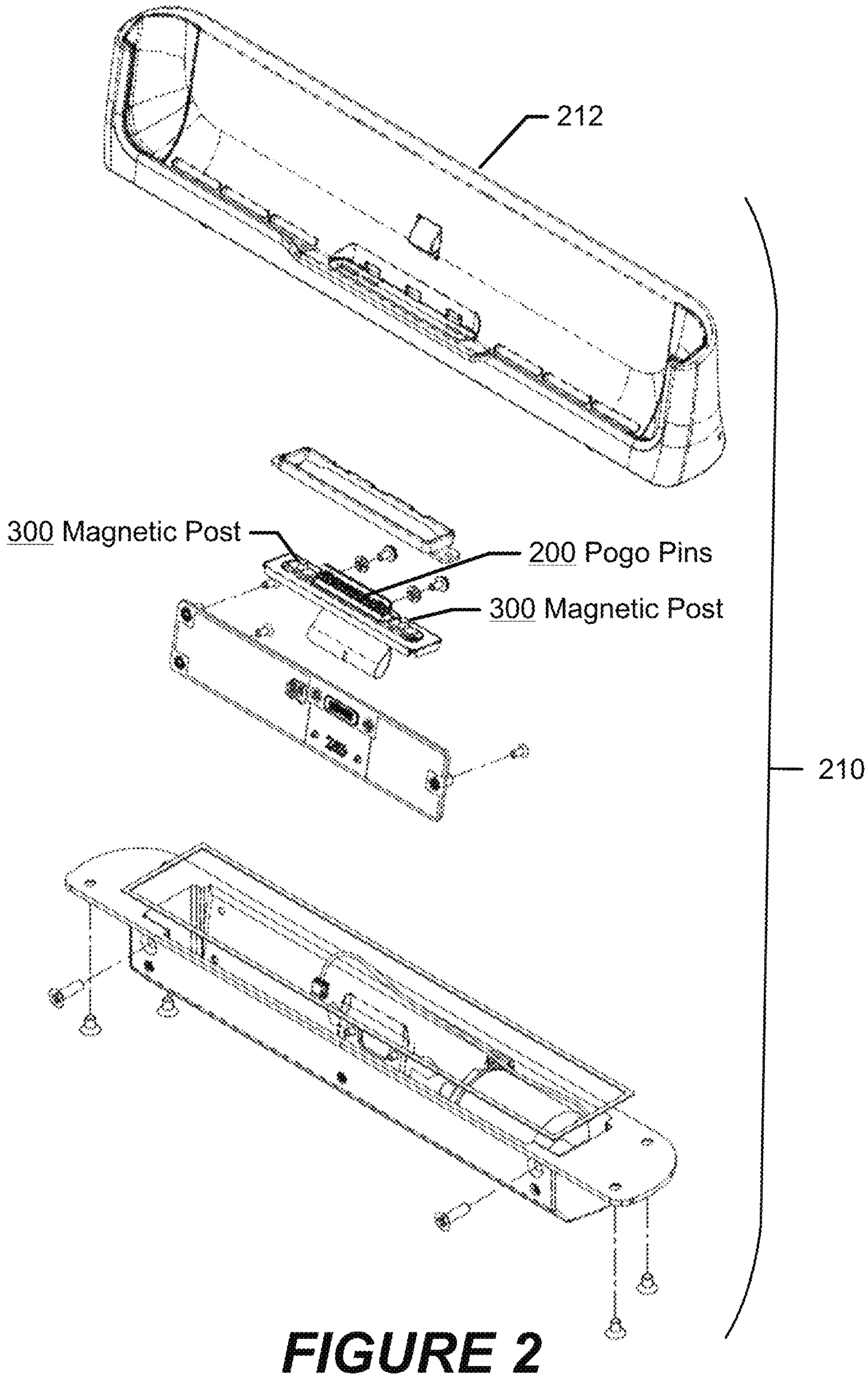
FIG. 2 illustrates an "exploded" isometric view of a docking station in accordance with some embodiments of the present disclosure.

FIG. 2 illustrates an “exploded” isometric view of a docking station in accordance with some embodiments of the present disclosure.

Referring to FIG. 2, a docking station 210 is configured to receive an electronic device, such as a tablet, to connect the electronic device to another electronic device capable of exchanging power and/or data. The docking station 210 includes a connector with a set of spring-biased pogo pins 200 (pogo pins) and a pair of magnetic couplers 300 (i.e., a magnetic post or magnetic socket). The docking station also includes a housing 212 of the first connector. The docking station 210 may be configured to be mounted in a seatback surface, armrest, bulkhead, or other surface of an aircraft or other vehicle.

The built-in connector of this electronic device which connects to the connector of the docking station includes a floating contact design. The floating contacts may be positioned in a recessed position when the connector is not in use and in an engaged position when the connector is in use. By stowing the floating contacts in a recessed position when not in use, the electrical contacts of the floating contacts can be prevented from experiencing excessive wear on account of rough or careless handling leading to scratching or degrading of the electrical contacts. The floating contacts can include a magnetic element that drives the floating contacts between the recessed and engaged positions. In some embodiments, the magnetic elements can be attracted to a magnetically attractable element within the accessory device when the connector is not in use. When the connector engages a connector of another electronic device, the connector of the electronic device can include one or more magnetically attractable elements that attract the magnets within the floating contacts with an amount of force sufficient to overcome the magnetic coupling between the magnets and the magnetically attractable element within the accessory device.

The electronic device which connects to the docking station can also include flexible electrically conductive pathways that remain attached to the floating contacts in both the recessed and engaged positions. In some embodiments, the flexible electrically conductive pathways can take the form of one or more flexible circuits. In one particular embodiment, the flexible circuit can take the form of a number of electrically conductive pathways printed upon a polymeric substrate. The polymeric substrate can include a cutout pattern that allows portions of the substrate to accommodate movement of the floating contacts without placing an undue amount of strain on the polymeric substrate. In this way, the electrical coupling between the floating contacts and the flexible circuits can be maintained in both positions.

Figure 3:
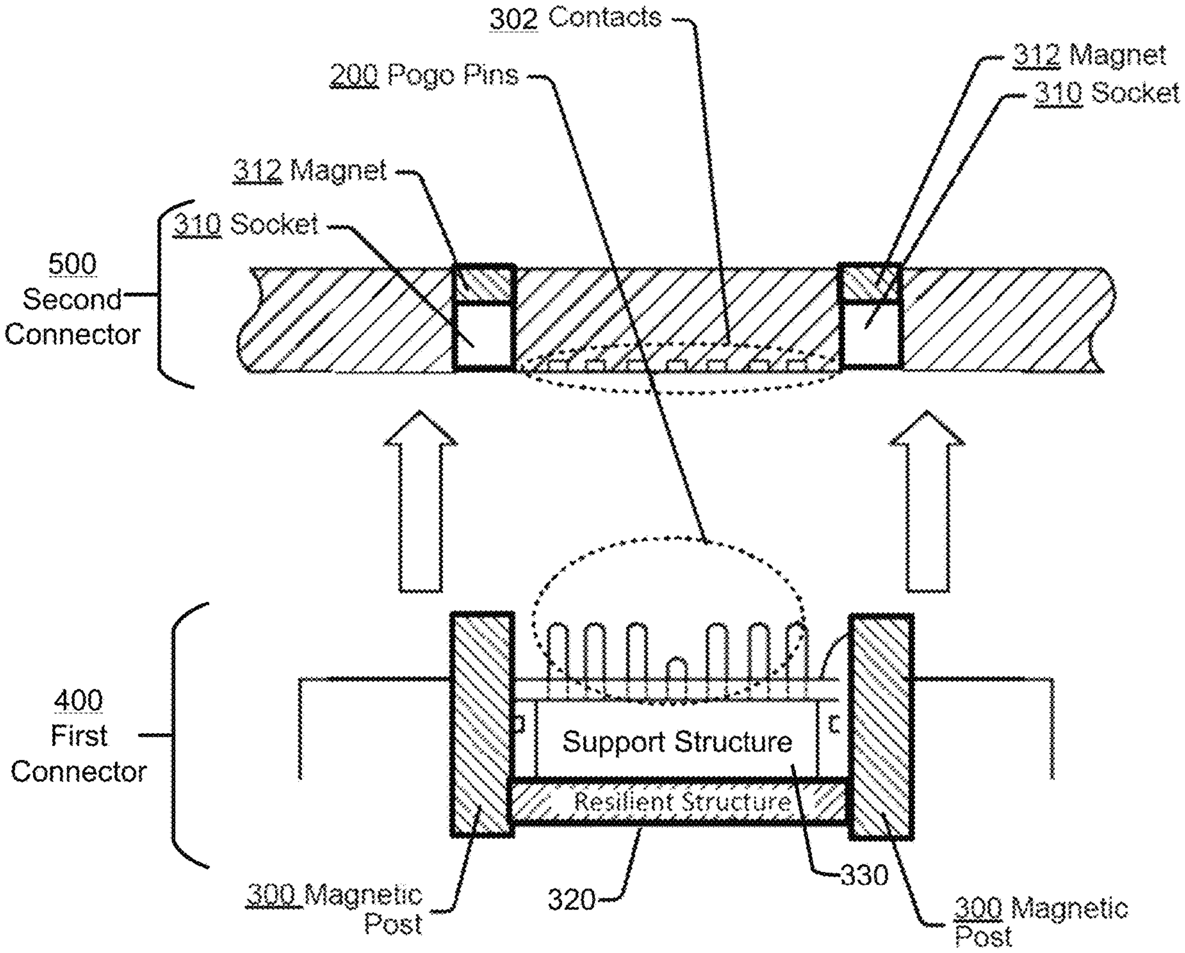
FIG. 3 illustrates a cross-sectional view of an example first connector for coupling to an example second connector in accordance with some embodiments of the present disclosure.

FIG. 3 illustrates a cross-sectional view of an example first connector 400 for coupling to an example second connector 500 in accordance with some embodiments of the present disclosure.

Referring to the example implementation illustrated in FIG. 3, the first connector 400 includes a support structure 330, a set of spring-biased pogo pins 200, a resilient structure 320, and a first pair of magnetic couplers 300. In this example, first pair of magnetic couplers 300 are magnetic posts. The set of spring-biased pogo pins 200 are arranged in a linear configuration and configured to carry at least one of electrical signals and power. Additionally, the spring-biased pogo pins 200 are each located in a corresponding passage in the support structure 330. The resilient structure 320 extends across a face of the support structure 330. The first pair of magnetic couplers 300 are attached to the resilient structure 320 on opposite sides of the set of spring-biased pogo pins 200. The first pair of magnetic couplers 300 are configured to mate with corresponding magnetic sockets 310 of a docking station and compress the resilient structure 320 to bias the set of spring-biased pogo pins 200 against a corresponding set of target contact pads 302 (contacts) of the second connector 500.

In the example implementation of FIG. 3, the magnetic sockets 310 include a permanently magnetized material 312 (magnet) because the magnetic posts 300 contain a material permanently attracted to a permanently magnetized material.

Figure 4:
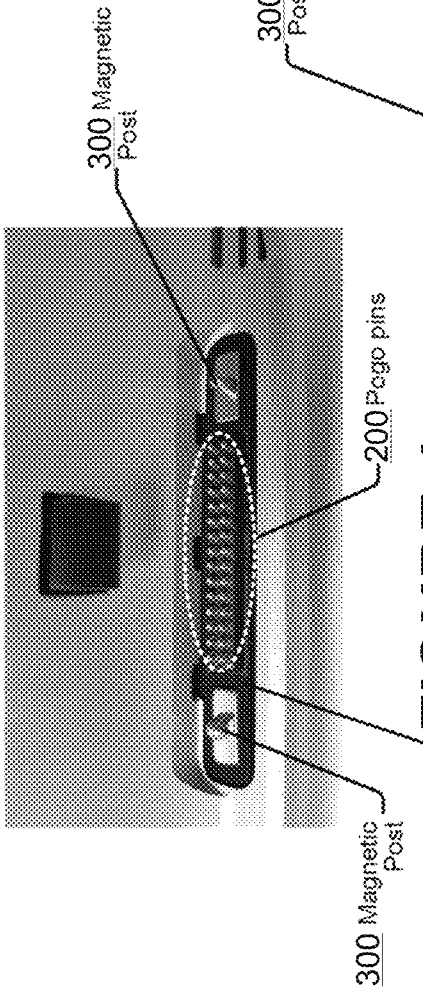
FIGS. 4 and 5 are example images of a docking station connector with pogo pins and resilient structure in accordance with some embodiments of the present disclosure.
Figure 5:
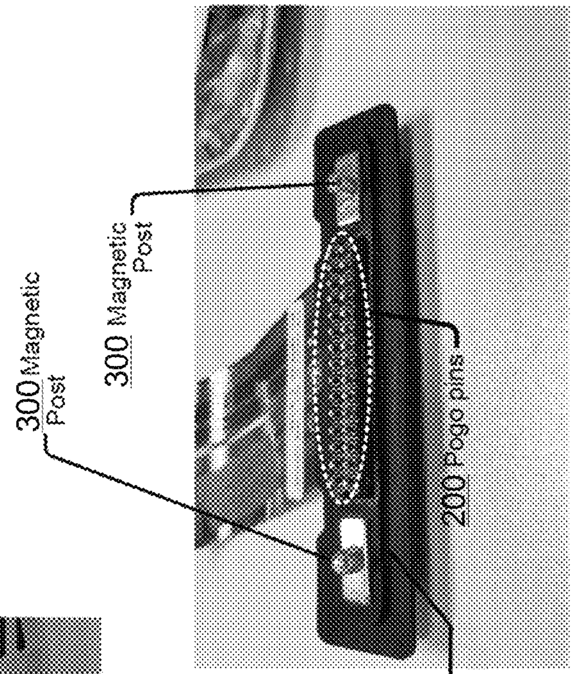

FIGS. 4 and 5 are example images of a docking station connector with spring-biased pogo pins 200 and resilient structure 320 in accordance with some embodiments of the present disclosure.

Figure 6:
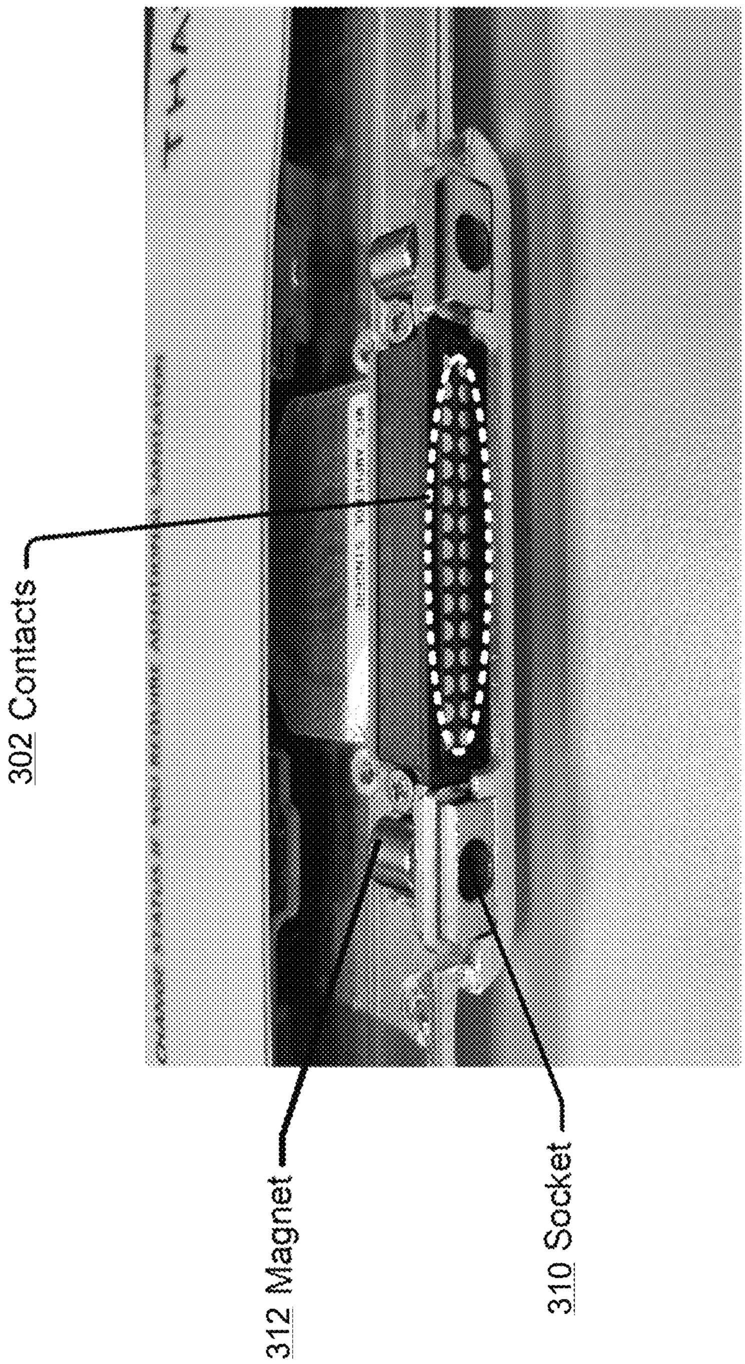
FIG. 6 is an example image of a tablet computer connector showing contact pads 302 which mate with pogo pins of the docking station of FIGS. 4 and 5 in accordance with some embodiments of the present disclosure.

FIG. 6 is an example image of a tablet computer connector showing contact pads 302 which mate with spring-biased pogo pins 200 of the docking station of FIG. 4 and in accordance with some embodiments of the present disclosure. The magnetic posts 300 of FIGS. 4 and 5 are configured to magnetically mate with sockets 310 and magnets 312 of FIG. 6.

The spring-biased pogo pins 200 are configured to have pins which protrude from a coupling face of the first connector 400 spaced apart with a defined interval between each pin. Each of the pogo pins 200 are biased outwardly by the resilient structure 320, and when the spring-biased pogo pins 200 are in contact with the target contact pads 302 they are aligned with corresponding target contact pads in a coupling face of the second connector 500. The spring-biased pogo pins 200 may maintain contact with the target contact pads 302 by being depressed inward by an amount, causing the resilient structure 320 to be put under load to apply force to the spring-biased pogo pins 200 in the direction of the target contact pads 302. Therefore, even if the spring-biased pogo pins 200 is slightly loose or moves, an electrical connection can be always maintained due to a structure of the resilient structure 320 applying force to the spring-biased pogo pins 200.

The present disclosure is not limited to the example implementations of the embodiments in FIGS. 2 through 6, and thus the number and/or configuration of spring-biased pogo pins 200 may be variously applied according to a function, type, or the like of the electronic device and/or connector.

In some embodiments, the first connector 400 is an integrated part of a docking station. The second connector 500 is an integrated part of a first electronic device. The docking station electrically interconnects the set of spring-biased pogo pins 200 to electronic circuits of a second electronic device. In some of these embodiments, the first electronic device comprises a tablet computer and the second electronic device comprises an inflight entertainment system.

In some embodiments, the first pair of magnetic couplers are rigidly attached to the resilient structure 320 and move relative to a housing 212 of the first connector 400 responsive to movement of the resilient structure 320. In some of these embodiments, a peripheral area of the resilient structure 320 is clamped to an opening of the housing 212 of the first connector 400.

In some embodiments, the first pair of magnetic couplers comprises a pair of magnetic posts that extend away from the resilient structure 320 in a direction parallel to the set of spring-biased pogo pins 200. The second pair of magnetic couplers comprises a pair of magnetic sockets that receive the pair of magnetic posts. Furthermore, while the pair of magnetic posts are fully received within the pair of magnetic sockets, the set of spring-biased pogo pins 200 are maintained aligned with the corresponding set of target contact pads, and the resilient structure 320 biases the set of spring-biased pogo pins 200 against the corresponding set of target contact pads of the second connector 500.

In some embodiments, the first pair of magnetic couplers comprises a pair of magnetic sockets extend in a direction parallel to the set of spring-biased pogo pins 200 and are configured to receive a pair of magnetic posts of the second pair of magnetic couplers of the second connector 500. Furthermore, while the pair of magnetic posts are fully received within the pair of magnetic sockets, the set of spring-biased pogo pins 200 are maintained aligned with the corresponding set of target contact pads, and the resilient structure 320 biases the set of spring-biased pogo pins 200 against the corresponding set of target contact pads of the second connector 500.

In some embodiments, the support structure 330 is embedded at least partially within the resilient structure 320. Additionally, the resilient structure 320 holds the set of spring-biased pogo pins 200 in an alignment extending toward the set of target contact pads while the first connector 400 is coupled to the second connector 500.

In some embodiments, the resilient structure 320 comprises at least one of an elastomer pad, a leaf spring, and a coil spring.

Other embodiments are directed to making the first connector of various embodiments of the present disclosure.

Figure 7:
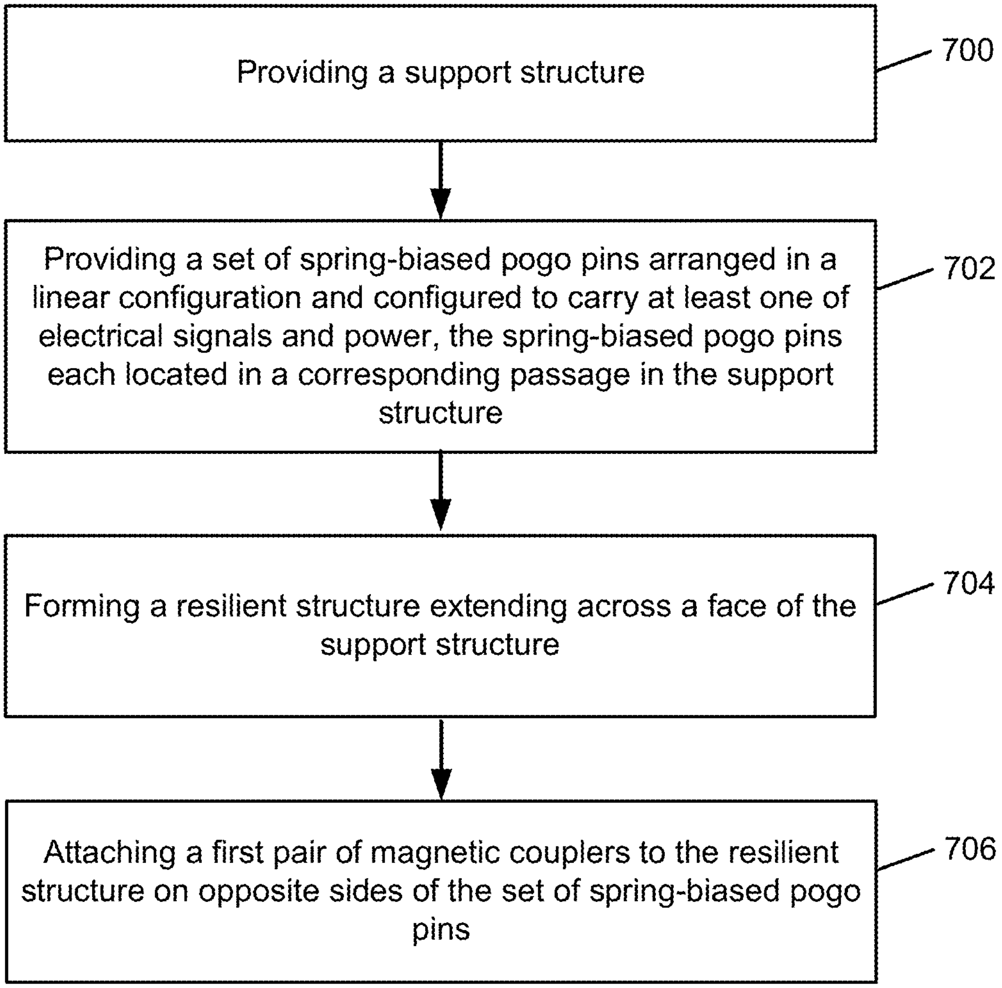
FIGS. 7-8 illustrate flow charts of operations and associated method of making a first connector for coupling to a second connector in accordance with some embodiments of inventive concepts.
Figure 8:
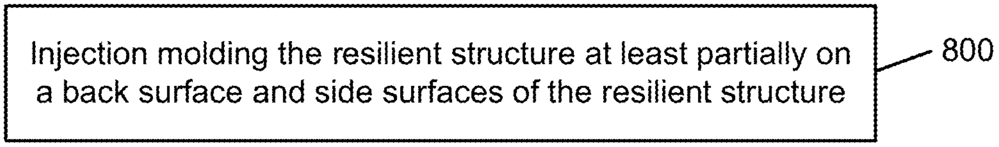

FIGS. 7-8 illustrate flow charts of operations and associated method of making a first connector for coupling to a second connector in accordance with some embodiments of inventive concepts.

Referring to FIG. 7, other embodiments of the present disclosure are directed to methods of making a first connector for coupling to a second connector. The method includes providing 700 a support structure. The method also includes providing 702 a set of spring-biased pogo pins arranged in a linear configuration and configured to carry at least one of electrical signals and power, the spring-biased pogo pins each located in a corresponding passage in the support structure. The method also includes forming 704 a resilient structure extending across a face of the support structure. The method also includes attaching 706 a first pair of magnetic couplers to the resilient structure on opposite sides of the set of spring-biased pogo pins. The first pair of magnetic couplers are configured to mate with a corresponding second pair of magnetic couplers of the second connector and compress the resilient structure to bias the set of spring-biased pogo pins against a corresponding set of target contact pads of the second connector.

Referring to FIG. 8, in some embodiments, the method includes injection molding 800 the resilient structure at least partially on a back surface and side surfaces of the resilient structure.

The methods are further directed to making one or more of the other embodiments disclosed herein, such as any one or more of the embodiments disclosed in FIGS. 2-6.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware without software or may be a combination of hardware and software executed by a computer controller.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A first connector for coupling to a second connector, comprising:
- a support structure;
- a set of spring-biased pogo pins arranged in a linear configuration and configured to carry at least one of electrical signals and power, the spring-biased pogo pins each located in a corresponding passage in the support structure,
- a resilient structure extending across a face of the support structure; and
- a first pair of magnetic couplers attached to the resilient structure on opposite sides of the set of spring-biased pogo pins;
- wherein the first pair of magnetic couplers are configured to mate with a corresponding second pair of magnetic couplers of the second connector and compress the resilient structure to bias the set of spring-biased pogo pins against a corresponding set of target contact pads of the second connector, and
- wherein the first pair of magnetic couplers are rigidly attached to the resilient structure and move relative to a housing of the first connector responsive to movement of the resilient structure.

2. The first connector of claim 1, wherein the first connector is an integrated part of a docking station, and the second connector is an integrated part of a first electronic device, the docking station electrically interconnects the set of spring-biased pogo pins to electronic circuits of a second electronic device.

3. The first connector of claim 2, wherein the first electronic device comprises a tablet computer and the second electronic device comprises an inflight entertainment system.

4. The first connector of claim 1, wherein a peripheral area of the resilient structure is clamped to the housing of the first connector.

5. The first connector of claim 1, wherein:
- the first pair of magnetic couplers comprises a pair of magnetic posts that extend away from the resilient structure in a direction parallel to the set of spring-biased pogo pins; and
- the second pair of magnetic couplers comprises a pair of magnetic sockets that receive the pair of magnetic posts, while the pair of magnetic posts are fully received within the pair of magnetic sockets, the set of spring-biased pogo pins are maintained aligned with the corresponding set of target contact pads, and the resilient structure biases the set of spring-biased pogo pins against the corresponding set of target contact pads of the second connector.

6. The first connector of claim 1, wherein:

the first pair of magnetic couplers comprises a pair of magnetic sockets extend in a direction parallel to the set of spring-biased pogo pins, and are configured to receive a pair of magnetic posts of the second pair of magnetic couplers of the second connector; and while the pair of magnetic posts are fully received within the pair of magnetic sockets, the set of spring-biased pogo pins are maintained aligned with the corresponding set of target contact pads, and the resilient structure biases the set of spring-biased pogo pins against the corresponding set of target contact pads of the second connector.

7. The first connector of claim 1, wherein:

the support structure is embedded at least partially within the resilient structure, and the resilient structure holds the set of spring-biased pogo pins in an alignment extending toward the set of target contact pads while the first connector is coupled to the second connector.

8. The first connector of claim 1, wherein the resilient structure comprises at least one of:

an elastomer pad;

a leaf spring; and a coil spring.

9. A method of making a first connector for coupling to a second connector, the method comprising:

providing a support structure;

providing a set of spring-biased pogo pins arranged in a linear configuration and configured to carry at least one of electrical signals and power, the spring-biased pogo pins each located in a corresponding passage in the support structure, forming a resilient structure extending across a face of the support structure; and attaching a first pair of magnetic couplers to the resilient structure on opposite sides of the set of spring-biased pogo pins;

wherein the first pair of magnetic couplers are configured to mate with a corresponding second pair of magnetic couplers of the second connector and compress the resilient structure to bias the set of spring-biased pogo pins against a corresponding set of target contact pads of the second connector, and wherein the first pair of magnetic couplers are rigidly attached to the resilient structure and move relative to a housing of the first connector responsive to movement of the resilient structure.

10. The method of claim 9, the method comprising:

injection molding the resilient structure at least partially on a back surface and side surfaces of the resilient structure.

11. The method of claim 9, wherein:

the first connector is an integrated part of a docking station, and the second connector is an integrated part of a first electronic device, the docking station electrically interconnects the set of spring-biased pogo pins to electronic circuits of a second electronic device.

12. The method of claim 11, wherein the first electronic device comprises a tablet computer and the second electronic device comprises an inflight entertainment system.

13. The method of claim 9, further comprising clamping a peripheral area of the resilient structure to the housing of the first connector.

14. The method of claim 9, wherein:

the first pair of magnetic couplers comprises a pair of magnetic posts that extend away from the resilient structure in a direction parallel to the set of spring-biased pogo pins; and the second pair of magnetic couplers comprises a pair of magnetic sockets that receive the pair of magnetic posts, while the pair of magnetic posts are fully received within the pair of magnetic sockets, the set of spring-biased pogo pins are maintained aligned with the corresponding set of target contact pads, and the resilient structure biases the set of spring-biased pogo pins against the corresponding set of target contact pads of the second connector.

15. The method of claim 9, wherein:

the first pair of magnetic couplers comprises a pair of magnetic sockets extend in a direction parallel to the set of spring-biased pogo pins, and are configured to receive a pair of magnetic posts of the second pair of magnetic couplers of the second connector; and while the pair of magnetic posts are fully received within the pair of magnetic sockets, the set of spring-biased pogo pins are maintained aligned with the corresponding set of target contact pads, and the resilient structure biases the set of spring-biased pogo pins against the corresponding set of target contact pads of the second connector.

16. The method of claim 9, wherein:

the support structure is embedded at least partially within the resilient structure, and the resilient structure holds the set of spring-biased pogo pins in an alignment extending toward the set of target contact pads while the first connector is coupled to the second connector.

17. The method of claim 9, wherein the resilient structure comprises at least one of:

an elastomer pad;

a leaf spring; and a coil spring.

* * * * *